(12) United States Patent
Mohamed et al.

(10) Patent No.: US 7,266,811 B2
(45) Date of Patent: Sep. 4, 2007

(54) METHODS, SYSTEMS, AND COMPUTER PROGRAM PRODUCTS FOR TRANSLATING MACHINE CODE ASSOCIATED WITH A FIRST PROCESSOR FOR EXECUTION ON A SECOND PROCESSOR

(75) Inventors: Moataz Mohamed, Irvine, CA (US); Keith Bindloss, Irvine, CA (US); Wade Guthrie, Laguna Beach, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 1070 days.

(21) Appl. No.: 09/946,877

(22) Filed: Sep. 5, 2001

(65) Prior Publication Data

US 2003/0046669 A1 Mar. 6, 2003

(51) Int. Cl.
*G06F 9/45* (2006.01)
*G06F 15/00* (2006.01)

(52) U.S. Cl. .................... 717/136; 717/138; 712/227

(58) Field of Classification Search ........ 717/136–161; 712/41, 23, 203, 221, 225
See application file for complete search history.

(56) References Cited

U.S. PATENT DOCUMENTS

| 5,664,215 A * | 9/1997 | Burgess et al. ............. 712/23 |
| 5,832,205 A * | 11/1998 | Kelly et al. ................ 714/53 |
| 5,926,832 A * | 7/1999 | Wing et al. ................ 711/141 |
| 5,958,061 A * | 9/1999 | Kelly et al. ................. 714/1 |
| 6,031,992 A * | 2/2000 | Cmelik et al. .............. 717/138 |
| 6,189,089 B1 * | 2/2001 | Walker et al. .............. 712/218 |
| 6,199,152 B1 * | 3/2001 | Kelly et al. ................ 711/207 |
| 6,393,555 B1 * | 5/2002 | Meier et al. ............... 712/222 |
| 6,418,488 B1 * | 7/2002 | Chilton et al. ............. 710/20 |

* cited by examiner

*Primary Examiner*—Hoang-Vu Antony Nguyen-Ba
(74) *Attorney, Agent, or Firm*—Myers Bigel Sibley & Sajovec

(57) ABSTRACT

Embodiments of systems, methods, and computer program products may facilitate translation of machine code associated with a first processor for execution on a second processor. Machine code associated with a first processor may be translated into a translated program that includes one or more translation instructions for execution on the second processor. The one or more translation instructions are used exclusively to translate machine code that is associated with a processor other than the second processor. The translated program may be stored in a storage medium where it may be executed using the second processor. Each translation instruction that involves access of the storage medium may be dispatched to one or more translation load-store units that are dedicated exclusively to processing the translation instructions. By translating machine code associated with a first processor into one or more translation instructions that are compatible with a second processor architecture, the second processor may execute both the translated program and programs compiled for execution on the second processor at the same time and would not have to run in separate modes (e.g., a translation mode and a non-translation mode).

41 Claims, 5 Drawing Sheets

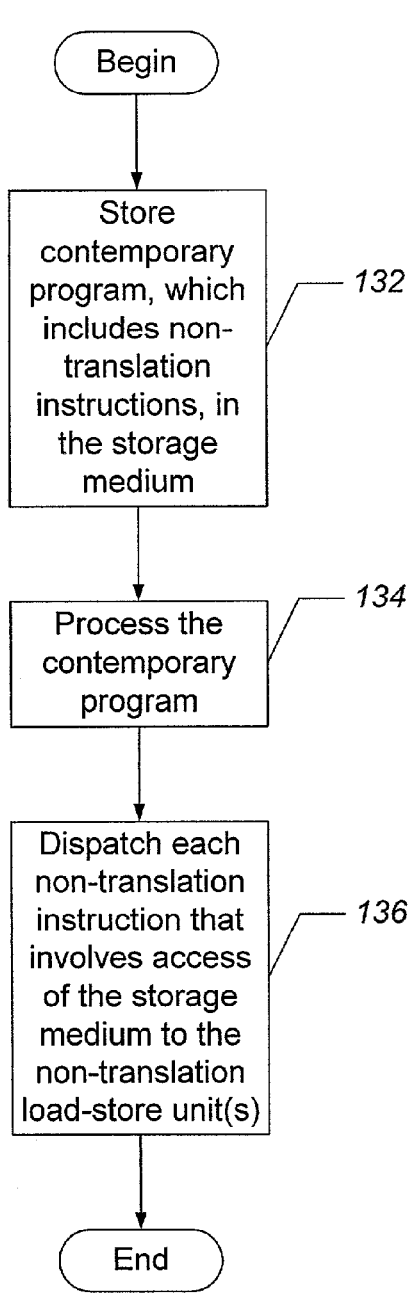
FIG. 6
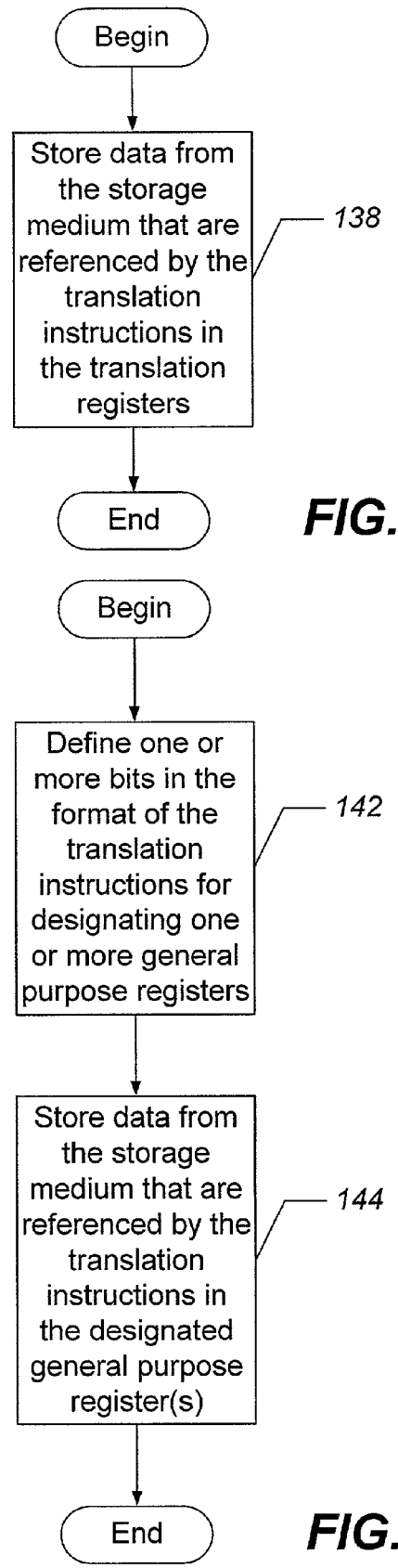
FIG. 7
FIG. 8

METHODS, SYSTEMS, AND COMPUTER PROGRAM PRODUCTS FOR TRANSLATING MACHINE CODE ASSOCIATED WITH A FIRST PROCESSOR FOR EXECUTION ON A SECOND PROCESSOR

BACKGROUND OF THE INVENTION

The present invention relates generally to the field of computer processors and, more particularly, to migration of legacy software to a contemporary processor.

To remain competitive in the industry, semiconductor companies have continually evolved their processor architectures to take advantage of improved hardware and software technologies. Unfortunately, as processor architectures evolve, legacy software that has been designed for previous processor versions may not execute on contemporary processor designs. Moreover, the high-level source code for the legacy software may no longer exist or may not be available. As a result, it may not be possible to re-compile the legacy software for the new hardware architecture. Migration of legacy software to contemporary processors may, therefore, be a difficult proposition. Several conventional approaches to this problem will be discussed hereafter.

One approach to migrating legacy software to a contemporary processor architecture is to design the contemporary processor so that it may operate in one or more modes that are backward compatible with one or more legacy processors. The contemporary processor may effectively be viewed as a multi-processor system with only one processor enabled at a time. Additional constraints may be placed on the design of the register sets in the contemporary processor to ensure that the legacy software may reference the new registers.

Another approach to migrating legacy software to a contemporary processor architecture is to implement a hardware run-time translator that translates legacy software instructions into one or more contemporary processor instructions in real time as the code is fetched from memory. One drawback to this approach, however, is that the run-time translator may consume large amounts of silicon area and power to perform the code translation.

Still another approach to migrating legacy software to a contemporary processor architecture is to use a software program that analyzes the legacy software and translates the legacy software instructions into new instructions that are compatible with the contemporary processor architecture. Because great dissimilarities may exist between the legacy processor architecture and the contemporary processor architecture, the translated software may be inefficient in both execution time and memory usage. Software developers may re-write inefficient code segments; however, these revisions may be error prone and may also be time intensive.

SUMMARY OF THE INVENTION

Embodiments of the present invention may include systems, methods, and computer program products for translating machine code associated with a first processor for execution on a second processor. For example, machine code associated with a first processor may be translated into a translated program that includes one or more translation instructions for execution on the second processor. The one or more translation instructions are used exclusively to translate machine code that is associated with a processor other than the second processor. The translated program may be stored in a storage medium where it may be executed using the second processor. Each translation instruction that involves access of the storage medium may be dispatched to one or more translation load-store units that are dedicated exclusively to processing the translation instructions. Advantageously, by translating machine code associated with a first processor into one or more translation instructions that are compatible with a second processor architecture, the second processor may execute both the translated program and programs compiled for execution on the second processor at the same time without the need to run in separate modes (e.g., a translation mode and a non-translation mode).

In other embodiments of the present invention, programs compiled for execution on the second processor, which comprise non-translation instructions, may be stored in the storage medium where they may be executed using the second processor. Each non-translation instruction that involves access of the storage medium may be dispatched to one or more non-translation load-store units that are dedicated exclusively to processing the non-translation instructions. Because the one or more translation load-store units are dedicated to processing only translation instructions and the one or more non-translation load-store units are dedicated to processing only non-translation instructions, the translation load-store units and the non-translation load-store units need be scheduled for operation only when the second processor is executing the translation instructions and the non-translation instructions, respectively. Accordingly, both scheduling overhead and power consumption associated with the load-store units may be reduced.

In still other embodiments of the present invention, a plurality of translation registers may be dedicated for exclusive use by the translation instructions for storing data from the storage medium that are referenced by the translation instructions. In particular embodiments, the translation instructions have a format in which no bits are defined for designating use of the translation registers. Thus, in accordance with the present invention, the translation registers may be used implicitly by the translation instructions, thereby alleviating the need to consume bits in the second processor's operation codes for referencing the translation registers.

In alternative embodiments of the present invention, a plurality of general-purpose registers may be used in lieu of the plurality of translation registers, and the translation instructions may have a format in which one or more bits are defined for designating one or more of the plurality of general purpose registers. As a result, data from the storage medium that are referenced by the translation instructions may be stored in one or more of the plurality of general purpose registers that are designated in the translation instructions.

In yet other embodiments of the present invention, a translation address register file may be associated with the one or more translation load-store units to facilitate the transfer of data that are referenced by the translation instructions between the storage medium and the translation registers. The translation address register file is typically used to assist the one or more translation load-store units in translating logical addresses into physical addresses in the storage medium. By implementing the translation address register file apart from a general-purpose address register file used by the second processor, power consumption may be reduced and less chip area may be consumed.

In other embodiments of the present invention, the translation instructions may comprise two sets of instructions: A first set of instructions may facilitate transfer of data between, for example, different address locations in the storage medium, the storage medium and the translation registers, and one translation register and another translation register. A second set of instructions may perform arithmetic operations using data that are stored in the translation registers as operands. The translation instructions preferably comprise a sub-class of the second processor's instruction set to allow translated machine code programs to execute concurrently with programs that are written and compiled specifically for the second processor. By using only two categories of instruction types, the present invention may be implemented without substantially increasing the instruction set of the second processor.

In still other embodiments of the present invention, machine code associated with the first processor may comprise complex instruction set computer (CISC) instructions and the second processor may be a reduced instruction set computer (RISC) processor with the translation instructions comprising RISC instructions. CISC machines may perform complex actions with a single instruction whereas, by contrast, RISC machines may use multiple instructions for the same action. As a result, code expansion (i.e., increased memory usage) may result when generating the RISC translation instructions from the machine code associated with the first processor. To reduce the impact of code expansion due to the generation of the RISC translation instructions, it may be preferable to use the translation registers that are dedicated for exclusive use by the RISC translation instructions as discussed hereinabove. The translation registers may be used implicitly by the RISC translation instructions without reserving bits in the second processor's operation codes, which may reduce or even eliminate code expansion.

Thus, the present invention may be used to efficiently migrate machine code associated with a first processor to a second processor without the need for extensive hardware or instruction set modifications or additions. Moreover, the hardware components of the present invention may be implemented without substantially increasing chip area and power consumption.

While the present invention has been described above primarily with respect to method aspects of the invention, it will be understood that the present invention may be embodied as methods, systems, and/or computer program products.

BRIEF DESCRIPTION OF THE DRAWINGS

Other features of the present invention will be more readily understood from the following detailed description of specific embodiments thereof when read in conjunction with the accompanying drawings, in which:

FIGS. 5-8 are flowcharts that illustrate exemplary operations of systems, methods, and computer products for translating machine code associated with a first processor for execution on a second processor in accordance with embodiments of the present invention.

DETAILED DESCRIPTION OF PREFERRED EMBODIMENTS

Figure 1:
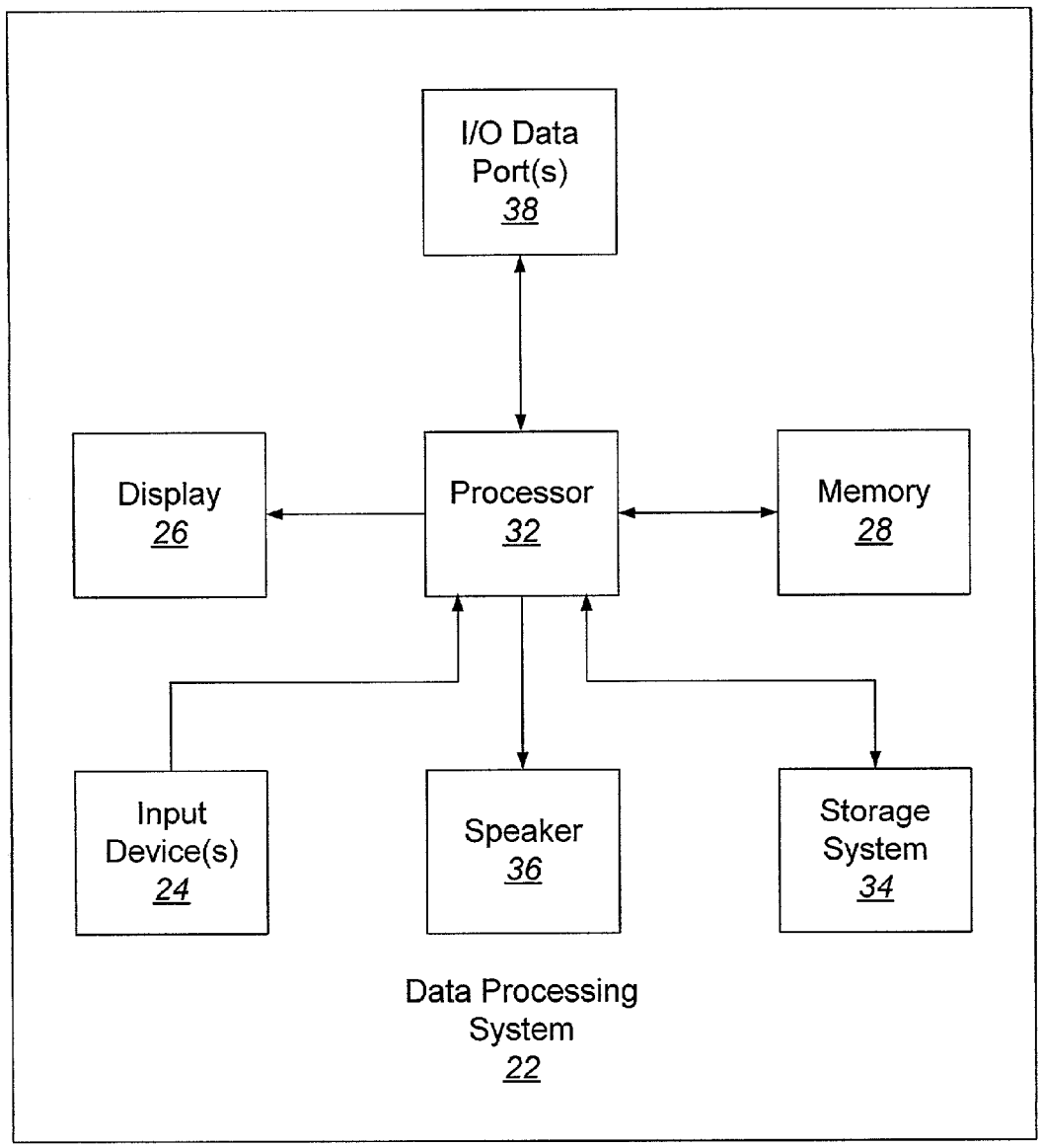
FIG. 1 is a block diagram that illustrates data processing systems in accordance with embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be embodied as systems, methods, and/or computer program products. Accordingly, the present invention may be embodied in hardware and/or in software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described hereafter in the context of translating machine code associated with a legacy processor for execution on a contemporary processor. It will be understood, however, that the present invention may be generally applied to translating machine code associated with a first processor for execution on a second processor without regard to the lineage of the first and second processors. For example, the first and second processors may both be contemporary processors, legacy processors, or one of the two processors may be a legacy processor and the other may be a contemporary processor.

Referring now to FIG. 1, an exemplary data processing system 22 architecture, in accordance with embodiments of the present invention, may include input device(s) 24, such as a keyboard or keypad, a display 26, and a memory 28 that communicate with a processor 32. The data processing system 22 may further include a storage system 34, a speaker 36, and an input/output (I/O) data port(s) 38 that also communicate with the processor 32. The storage system 34 may include removable and/or fixed media, such as floppy disks, ZIP drives, hard disks, or the like, as well as virtual storage, such as a RAMDISK. The I/O data port(s) 38 may be used to transfer information between the data processing system 22 and another computer system or a network (e.g., the Internet). These components may be conventional components such as those used in many conventional computing devices, which may be configured to operate as described herein.

Figure 2:
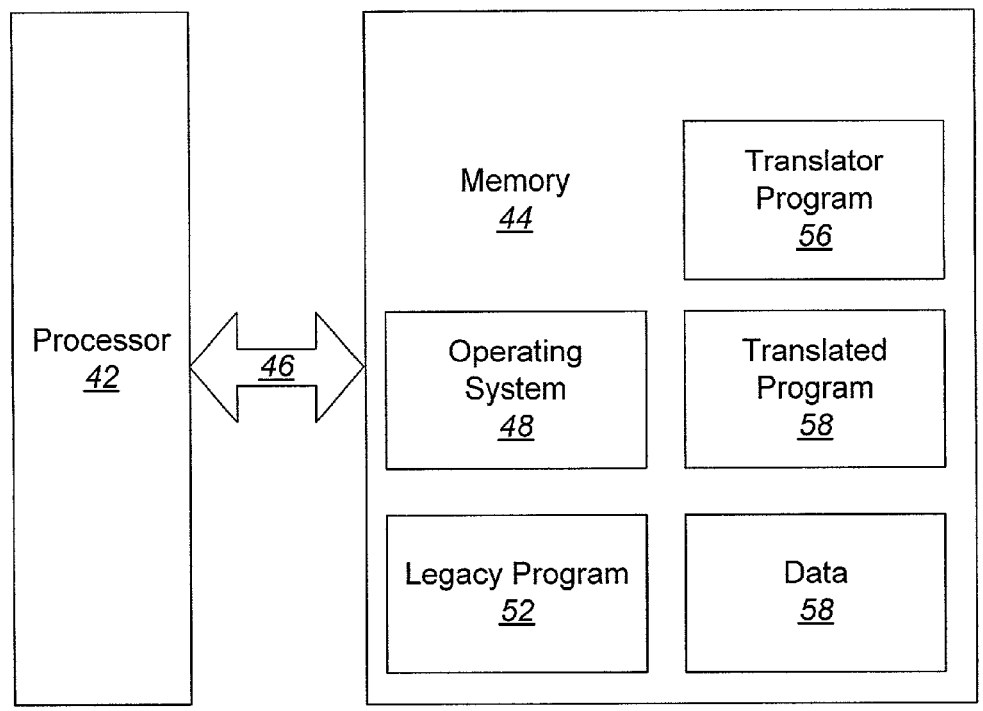
FIGS. 2-3 are software architecture block diagrams that illustrate systems, methods, and computer program products for translating machine code associated with a first processor for execution on a second processor in accordance with embodiments of the present invention.

FIG. 2 illustrates a processor 42 and a memory 44 that may be used in embodiments of systems, methods, and computer program products for translating machine code associated with a first processor for execution on a second processor in accordance with embodiments of the present invention. The processor 42 communicates with the memory 44 via an address/data bus 46. The processor 42 may be, for example, a commercially available or custom microprocessor. The memory 44 is representative of the overall hierarchy of memory devices containing the software and data used to translate a legacy computer program for execution on a contemporary processor in accordance with the present invention. The memory 44 may include, but is not limited to, the following types of devices: cache, ROM, PROM, EPROM, EEPROM, flash, SRAM, and DRAM.

As shown in FIG. 2, the memory 44 may hold five major categories of software and data: the operating system 48, the legacy program module 52, the translator program module 56, the translated program module 58, and the data module 58. The operating system 48 controls the operation of the computer system. In particular, the operating system 48 may manage the computer system's resources and may coordinate execution of programs by the processor 42. The legacy program module 52 includes legacy program machine code that is associated with a legacy processor (i.e., compiled for execution on the legacy processor). The translator program module 56 may be configured to translate the legacy program module 52 machine code into machine code that is executable on a contemporary processor. This translated machine code is represented as the translated program module 58. Finally, the data module 58 represents both the dynamic and static data used by the aforementioned software modules to carry out their respective operations.

In accordance with embodiments of the present invention, the processor 42 may represent a contemporary processor, which is used to execute the translated program 58. Alternatively, the translator program 56 may generate the translated program 58 for execution on another target processor as discussed hereafter with reference to FIG. 3.

Figure 3:
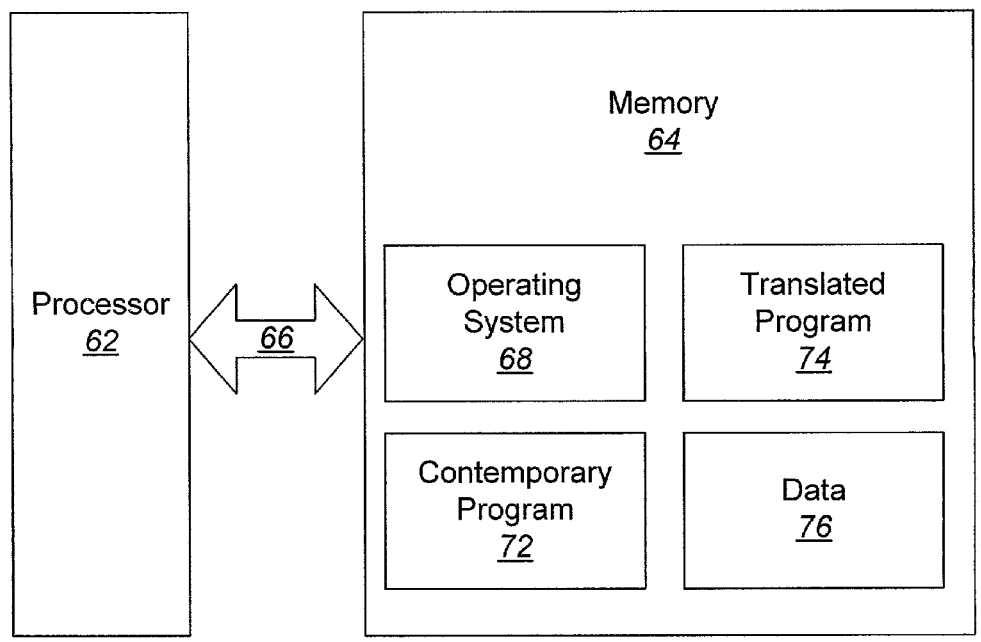

FIG. 3 illustrates a processor 62 and a memory 64 that may be used in embodiments of systems, methods, and computer program products for translating machine code associated with a first processor for execution on a second processor in accordance with embodiments of the present invention. The processor 62 may represent a contemporary processor and may communicate with the memory 64 via an address/data bus 66. The processor 62 may be, for example, a commercially available or custom microprocessor. The memory 64 is representative of the overall hierarchy of memory devices containing the software and data used to translate a legacy computer program for execution on a contemporary processor in accordance with the present invention. The memory 64 may include, but is not limited to, the following types of devices: cache, ROM, PROM, EPROM, EEPROM, flash, SRAM, and DRAM.

As shown in FIG. 3, the memory 64 may hold four major categories of software and data: the operating system 68, the contemporary program module 72, the translated program module 74, and the data module 76. The operating system 68 controls the operation of the computer system. In particular, the operating system 68 may manage the computer system's resources and may coordinate execution of programs by the processor 62. The contemporary program module 72 represents software programs that are specifically written and compiled for execution on the processor 62. The translated program module 74 corresponds to the translated program module 58 of FIG. 2. That is, the translated program module 74 comprises one or more translation instructions that have been generated by the translator program module 56 of FIG. 2 for execution on the contemporary processor 62. In accordance with the present invention, translation instructions are used exclusively to translate the behavior of machine code associated with another processor for execution on a target processor. Finally, the data module 76 represents both the dynamic and static data used by the aforementioned software modules to carry out their respective operations.

Although FIGS. 2 and 3 illustrate an exemplary software architecture that may be used for translating machine code associated with a first processor for execution on a second processor, it will be understood that the present invention is not limited to such a configuration but is intended to encompass any configuration capable of carrying out the operations described herein.

Computer program code for carrying out operations of the present invention may be written in an object-oriented programming language, such as Java, Smalltalk, or C++. Computer program code for carrying out operations of the present invention may also, however, be written in conventional procedural programming languages, such as the C programming language or compiled Basic (CBASIC). Furthermore, some modules or routines may be written in assembly language or even micro-code to enhance performance and/or memory usage. Note that the legacy program module 52 typically comprises machine code that has been compiled for a legacy processor. The translated program modules 58 and 74 comprise translation instructions, which are generally implemented as machine code (i.e., assembly language instructions) that are executable on a contemporary processor.

Figure 4:
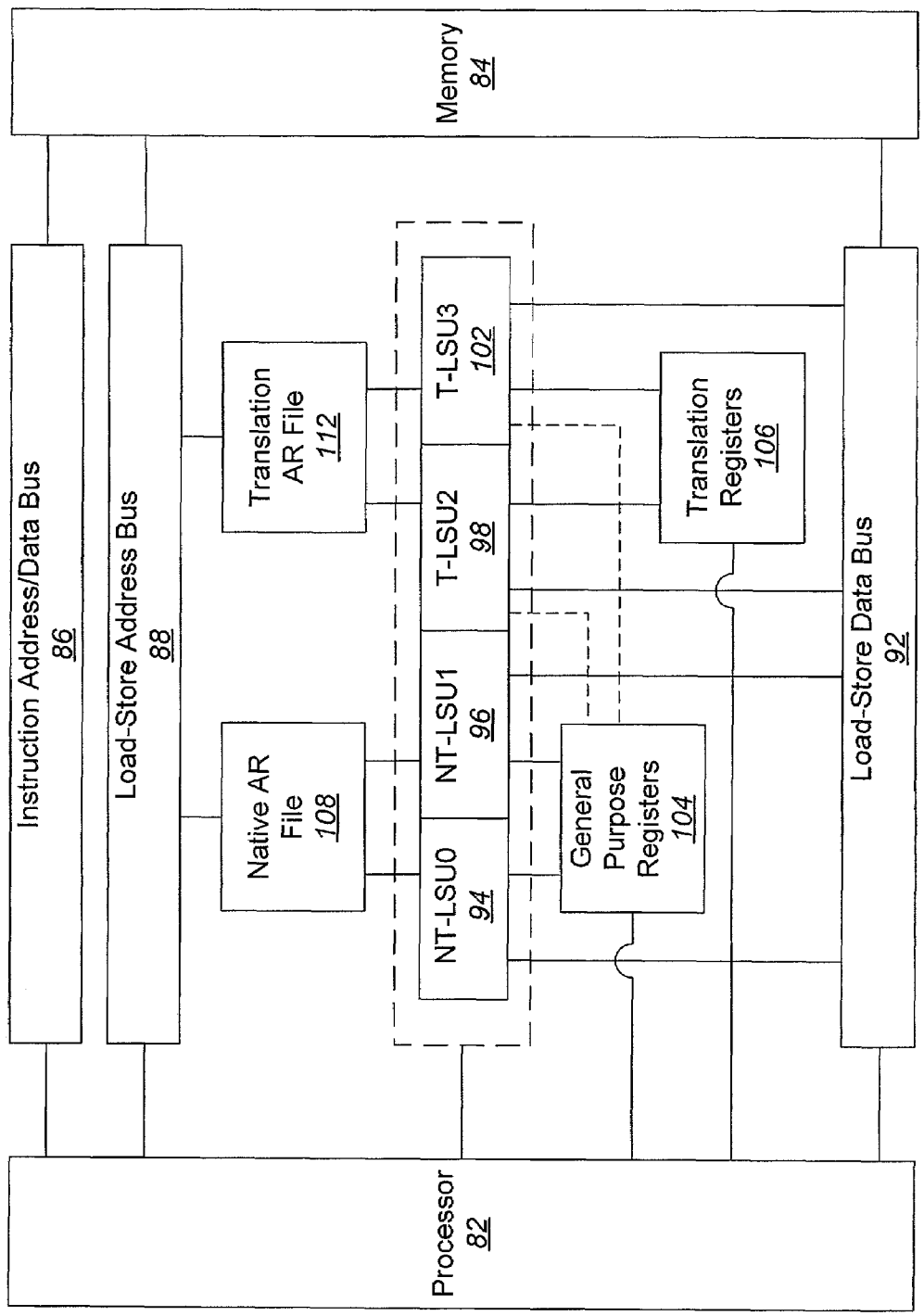
FIG. 4 is a hardware architecture block diagram that illustrates systems, methods, and computer products for translating machine code associated with a first processor for execution on a second processor in accordance with embodiments of the present invention.

Referring now to FIG. 4, a contemporary processor hardware architecture, in accordance with embodiments of the present invention, may include a processor 82 that communicates with a memory (i.e., a storage medium) 84 via an instruction address/data bus 86, a load-store address bus 88, and a load-store data bus 92. The instruction address/data bus 86 may be implemented as two separate buses: one bus for instruction addresses and one bus for data. As illustrated in FIG. 4, the processor 82 may be implemented as a load-store, reduced instruction set computer (RISC) processor. Broadly stated, RISC refers to a processor architecture that is based on execution of a relatively small set of simple instructions that may be executed rapidly, preferably within a single clock cycle. A "load-store" design refers to the concept used in RISC systems in which arithmetic operations are separated from memory access operations. For example, an add operation involving two operands may involve two load instructions to move the respective operands from memory into registers. A third instruction may be used to add the operands stored in the two registers together and then to store the result in another register or one of the registers in which the two operands are stored. Finally, a fourth instruction may be used to move the result of the add operation from the register in which it is stored back into memory.

One advantage to RISC systems is that by using relatively simple instructions of the same length, it is generally easier to streamline the hardware implementation and simplify the pipeline design, hence improving machine cycle time. Furthermore, because all compute instructions are register based and only load and store instructions access memory, it may be easier to issue multiple instructions in parallel. For example, in a RISC system, one load, one multiple, and two add instructions may be issued in parallel. In a CISC system, this would require the memory to support seven separate read operations to fetch the operands needed for the four instructions.

Returning to FIG. 4, the contemporary processor hardware architecture may further include a set of load-store units 94, 96, 98, and 102 that facilitate transfer of data between the memory 84 and local registers used by the processor 82. In accordance with the present invention, the load-store units 94 and 96 are dedicated exclusively to processing non-translation instructions and the load-store units 98 and 102 are dedicated exclusively to processing translation instructions (i.e., instructions that are dedicated for use in by the translator program 56 in generating the translated program 58).

The local registers used by the processor 82 may include a plurality of general-purpose registers 104, which are used by the non-translation load-store units 94 and 96 to store data (e.g., operands) from the memory 84 for processing by the processor 82. In accordance with the present invention, the local registers may further include a plurality of translation registers 106, which are used exclusively by the translation load-store units 98 and 102 to store data (e.g., operands) from the memory 84 for processing by the processor 82. The translation registers 106 may not be implemented in alternative embodiments of the present invention and the translation load-store units 98 and 102 may use the plurality of general purpose registers 104 to store data from the memory 84, as represented by the dashed lines.

To facilitate transfer of data between the memory 84 and the general-purpose registers 104 and/or the translation registers 106, an address register file may be used. In general, address register files may be used to assist in converting logical memory addresses into physical memory addresses. In accordance with embodiments of the present invention, the address register file may be implemented as a native address register file 108, which is associated exclusively with the non-translation load-store units 94 and 96, and a translation address register file 112, which is associated exclusively with the translation load-store units 98 and 102. Because the general-purpose registers 104 are relatively small and comprise few registers, they generally consume less power than the native address register file 108. Moreover, because the general-purpose registers 104 are implemented separately from the native address register file 108, power consumption is not penalized while running the native code. Furthermore, because the native address register file 108 and the translation address register file 112 are not used simultaneously, power consumption may be reduced as only one of the two address register files is operable at a time.

The present invention is described hereinafter with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 5:
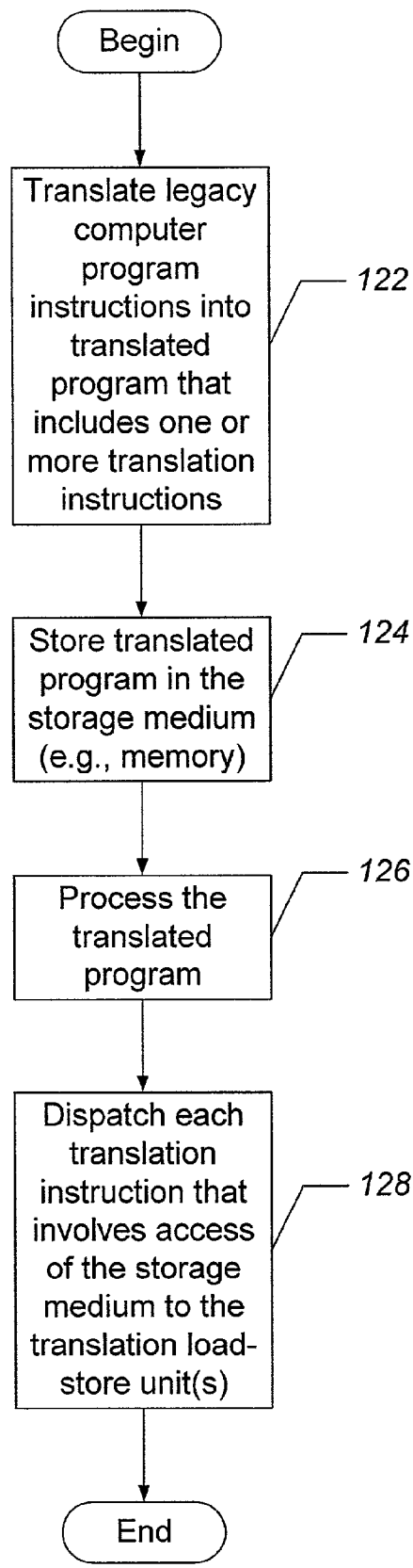

With reference to the flowcharts of FIGS. 5-8 and the architectural block diagrams of FIGS. 2-4, exemplary operations of systems, methods, and computer program products for translating machine code associated with a first processor for execution on a second processor, in accordance with embodiments of the present invention, will be described hereafter. Referring now to FIG. 5, operations begin at block 122 where the translator program 56 translates the legacy program 52 into a translated program 58 that comprises one or more translation instructions that are used exclusively to translate machine code associated with another processor for execution on a target processor. In accordance with the present invention, the translated program 58 may be comprised entirely of translation instructions or a combination of non-translation instructions and one or more translation instructions. In particular embodiments of the present invention, the translation instructions may comprise two sets of instructions: A first set of instructions may facilitate the transfer of data. For example, data may be transferred between different address locations in the memory 84, between the memory 84 and the translation registers 106, and between one of the translation registers 106 and another one of the translation registers 106. A second set of instructions may perform arithmetic operations using data that are stored in the translation registers 106 as operands. The translation instructions are preferably implemented as a sub-class of the contemporary processor's instruction set to allow the translated program 74 to execute concurrently with the contemporary program 72, which is written and compiled specifically for the contemporary processor 62. Accordingly, the contemporary processor 82 need not operate in separate modes (e.g., a contemporary mode or a legacy/translation mode) based on whether a contemporary program 72 is executing or whether a translated program 74 is executing. Because the translation instructions comprise only two categories of instruction types, the present invention may be implemented without substantially increasing the instruction set of the contemporary processor 82.

Returning to FIG. 5, operations continue at block 124 where the translated program 74 is stored in the memory 84. The processor 62 may then process or execute the translated program at block 126. If a translation instruction involves access of the memory 84, then the processor 82 may dispatch that translation instruction to one of the translation load-store units 98 or 102 for processing at block 128 as discussed hereinabove.

In further embodiments of the present invention illustrated in FIG. 6, the contemporary program 72, which is comprised entirely of non-translation instructions, may also be stored in the memory 84 at block 132 and the processor 82 may process or execute the non-translation instructions at block 134. If a non-translation instruction involves access of the memory 84, then the processor 82 may dispatch the non-translation instruction to one of the non-translation load-store units 94 or 96 for processing at block 136 as discussed hereinabove. Recall that the translation load-store units 98 and 102 are dedicated to processing only translation instructions and the non-translation load-store units 94 and 96 are dedicated to processing only non-translation instructions. This may allow the translation load-store units 98 and 102 to be scheduled for operation only when the processor 82 is processing translation instructions and the non-translation load-store units 94 and 96 to be scheduled for operation only when the processor 82 is processing non-translation instructions. As a result, scheduling overhead and power consumption associated with the load-store units 94, 96, 98, and 102 may be reduced.

FIG. 7 illustrates further embodiments of the present invention in which data from the memory 84 that are referenced by the translation instructions are stored in the translation registers 106 by one of the translation load-store units 98 or 102 at block 138. As discussed hereinabove, the translation registers 106 may be dedicated for exclusive use by the translation instructions. In accordance with particular embodiments of the present invention, the translation instructions may have a format in which few or no bits are defined for designating use of the translation registers 106. Therefore, the translation registers 106 may be used implicitly by the translation instructions, which may alleviate the need to designate bits in the contemporary processor's operation codes for referencing the translation registers 106.

The legacy program 52 may comprise complex instruction set computer (CISC) instructions and the processor 82 may be embodied as a RISC processor architecture with the translation instructions being RISC instructions. Each CISC instruction may correspond to a series of operations inside the processor. Therefore, when the translator program 56 translates the legacy program 52, many translation instructions may be generated for a legacy CISC instruction, which may result in code expansion (i.e., increased memory usage). Advantageously, use of the translation registers 106 may lessen the impact of code expansion due to the increased number of RISC instructions as compared to CISC instructions because the RISC translation instructions need not set aside bits in the contemporary processor's operation codes to address the translation registers 106. The length of the RISC translation instructions may, therefore, be shorter, which may reduce or even eliminate code expansion.

FIG. 8 illustrates alternative embodiments to those discussed above with reference to FIG. 7. Recall from the discussion of FIG. 4 that instead of implementing the translation registers 106, all of the load-store units 94, 96, 98, and 102 may use the general-purpose registers 104 to store data from the memory 84. Referring now to FIG. 8, one or more bits may be defined in the format of the translation instructions at block 142 for designating one or more of the general purpose registers 104. Then, as represented by block 144, a translation load-store unit 98, 102 may store data from the memory 84 in the general-purpose register(s) that are designated by a particular translation instruction. By eliminating the translation registers 106, hardware complexity may be reduced, but these hardware savings may come at the expense of consuming additional bits in the contemporary processor's operation codes.

From the foregoing it can readily be seen that, in accordance with the present invention, a legacy computer program may be used to efficiently migrated to a contemporary processor without the need for extensive hardware or software modifications or additions. Moreover, the hardware components of the present invention may be implemented without substantially increasing chip area and power consumption, which may make the present invention particularly useful in digital signal processing (DSP) applications, which may be especially power and cost sensitive.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

We claim:

1. A data processing system, comprising:
    a processor;
    a storage medium that is communicatively coupled to the processor and contains translation instructions that are generated exclusively as a result of translating machine code that is associated with another processor; and
    a translation load-store unit that is communicatively coupled to the processor and the storage medium and that exclusively processes the translation instructions.

2. A data processing system as recited in claim 1, further comprising:
    a plurality of translation registers that are communicatively coupled to both the processor and the translation load-store unit and that are used exclusively by the translation instructions, the translation instructions having a format in which no bits are defined for designating use of the plurality of translation registers.

3. A data processing system as recited in claim 2, further comprising:
    a translation address register file that is exclusively associated with the translation load-store unit and is communicatively coupled thereto and that facilitates transfer of data referenced by the translation instructions between the storage medium and the plurality of translation registers.

4. A data processing system as recited in claim 2, wherein the translation instructions comprise a first set of instructions that in cooperation with the processor and the translation load-store unit facilitate transfer of data between different address locations in the storage medium, between the storage medium and the plurality of translation registers, and between one of the plurality of translation registers and another one of the plurality of translation registers.

5. A data processing system as recited in claim 4, wherein the translation instructions further comprise a second set of instructions that in cooperation with the processor perform arithmetic operations using data stored in the plurality of translation registers as operands.

6. A data processing system as recited in claim 5, wherein the machine code that is associated with another processor comprises complex instruction set computer (CISC) instructions.

7. A data processing system as recited in claim 1, wherein the processor is a reduced instruction set computer (RISC) processor, and wherein the translation instructions comprise RISC instructions.

8. A data processing system as recited in claim 1, further comprising:
 a plurality of general purpose registers that are communicatively coupled to both the processor and the translation load-store unit; and
 wherein the translation instructions have a format in which at least one bit is defined for designating use of at least one of the plurality of general purpose registers.

9. A data processing system as recited in claim 1, further comprising:
 a non-translation load-store unit that is communicatively coupled to the processor and that exclusively processes non-translation instructions.

10. A data processing system, comprising:
 a processor having an instruction set that is associated therewith in which at least one instruction is a translation instruction that is used exclusively to translate machine code that is associated with another processor.

11. A data processing system as recited in claim 10, wherein the translation instructions comprise a first set of instructions that in cooperation with the processor facilitate transfer of data between data storage locations.

12. A data processing system as recited in claim 11, wherein the translation instructions further comprise a second set of instructions that in cooperation with the processor perform arithmetic operations using the data as operands.

13. A data processing system as recited in claim 10, wherein the processor is a reduced instruction set computer (RISC) processor, and wherein the translation instructions comprise RISC instructions.

14. A data processing system as recited in claim 13, wherein the machine code that is associated with another processor comprises complex instruction set computer (CISC) instructions.

15. A data processing system, comprising:
 a processor;
 a storage medium that is communicatively coupled to the processor;
 a plurality of translation load-store units that are communicatively coupled to the processor and that exclusively processes translation instructions that are generated exclusively as a result of translating machine code that is associated with another processor;
 a plurality of translation registers that are communicatively coupled to both the processor and the plurality of translation load-store units and that are used exclusively by the translation instructions, the translation instructions having a format in which no bits are defined for designating use of the plurality of translation registers; and
 a translation address register file that is exclusively associated with the plurality of translation load-store units and is communicatively coupled thereto and that facilitates transfer of data referenced by the translation instructions between the storage medium and the plurality of translation registers.

16. A data processing system as recited in claim 15, wherein the translation instructions comprise a first set of instructions that in cooperation with the processor and the translation load-store unit facilitate transfer of data between different address locations in the storage medium, between the storage medium and the plurality of translation registers, and between one of the plurality of translation registers and another one of the plurality of translation registers.

17. A data processing system as recited in claim 16, wherein the translation instructions further comprise a second set of instructions that in cooperation with the processor perform arithmetic operations using data stored in the plurality of translation registers as operands.

18. A data processing system as recited in claim 15, wherein the processor is a reduced instruction set computer (RISC) processor and wherein the translation instructions comprise RISC instructions.

19. A data processing system as recited in claim 18, wherein the machine code that is associated with another processor comprises complex instruction set computer (CISC) instructions.

20. A method of translating machine code that is associated with a first processor for execution on a second processor, comprising the steps of:
 translating the machine code into at least one translation instruction that is used exclusively to translate machine code that is associated with another processor for execution on the second processor;
 storing the at least one translation instruction in a storage medium;
 executing the at least one translation instruction in the storage medium using the second processor; and
 dispatching each of the at least one translation instruction that involves access of the storage medium to at least one translation load-store unit that is dedicated exclusively to processing the at least one translation instruction.

21. A method as recited in claim 20, further comprising the steps of:
 storing non-translation instructions in the storage medium;
 executing the non-translation instructions in the storage medium using the second processor; and
 dispatching each of the non-translation instructions that involve access of the storage medium to at least one non-translation load-store unit that is dedicated exclusively to processing the non-translation instructions.

22. A method as recited in claim 20, further comprising the step of:
 storing data from the storage medium that are referenced by the at least one translation instruction in a plurality of translation registers that are dedicated for exclusive use by the at least one translation instruction.

23. A method as recited in claim 22, wherein the at least one translation instruction has a format in which no bits are defined for designating use of the plurality of translation registers.

24. A method as recited in claim 22, further comprising the step of:
 associating a translation address register file with the at least one translation load-store unit to facilitate transfer of data referenced by the at least one translation instruction between the storage medium and the plurality of translation registers.

25. A method as recited in claim 20, wherein the second processor is a reduced instruction set computer (RISC) processor, and wherein the at least one translation instruction comprises RISC instructions.

26. A method as recited in claim 25, wherein the machine code that is associated with a first processor comprises complex instruction set computer (CISC) instructions.

27. A method as recited in claim 20, further comprising the steps of:

defining at least one bit in a format of the at least one translation instruction to designate at least one of a plurality of general purpose registers; and storing data from the storage medium that are referenced by the at least one translation instruction in the at least one of the plurality of general-purpose registers that is designated in the at least one translation instruction.

28. A system for translating machine code that is associated with a first processor for execution on a second processor, comprising:

means for translating the machine code into at least one translation instruction that is used exclusively to translate machine code that is associated with another processor for execution on the second processor;

means for storing the at least one translation instruction in a storage medium;

means for executing the at least one translation instruction in the storage medium using the second processor; and means for dispatching each of the at least one translation instruction that involves access of the storage medium to at least one translation load-store unit that is dedicated exclusively to processing the at least one translation instruction.

29. A system as recited in claim 28, further comprising:

means for storing non-translation instructions in the storage medium;

means for executing the non-translation instructions in the storage medium using the second processor; and means for dispatching each of the non-translation instructions that involve access of the storage medium to at least one non-translation load-store unit that is dedicated exclusively to processing the non-translation instructions.

30. A system as recited in claim 28, further comprising:

means for storing data from the storage medium that are referenced by the at least one translation instruction in a plurality of translation registers that are dedicated for exclusive use by the at least one translation instruction.

31. A system as recited in claim 30, wherein the at least one translation instruction has a format in which no bits are defined for designating use of the plurality of translation registers.

32. A system as recited in claim 30, further comprising:

means for associating a translation address register file with the at least one translation load-store unit to facilitate transfer of data referenced by the at least one translation instruction between the storage medium and the plurality of translation registers.

33. A system as recited in claim 28, wherein the second processor is a reduced instruction set computer (RISC) processor, and wherein the at least one translation instruction comprises RISC instructions.

34. A system as recited in claim 33, wherein the machine code that is associated with a first processor comprises complex instruction set computer (CISC) instructions.

35. A system as recited in claim 28, further comprising:

means for defining at least one bit in a format of the at least one translation instruction to designate at least one of a plurality of general purpose registers; and means for storing data from the storage medium that are referenced by the at least one translation instruction in the at least one of the plurality of general-purpose registers that is designated in the at least one translation instruction.

36. A computer program product for translating machine code that is associated with a first processor for execution on a second processor, comprising:

a computer readable storage medium having computer readable program code embodied therein, the computer readable program code comprising:

computer readable program code for translating the machine code that is associated with the first processor into at least one translation instruction that is used exclusively in translating machine code associated with another processor for execution on the second processor.

37. A computer program product as recited in claim 36, wherein the second processor is communicatively coupled to a plurality of translation registers that are used exclusively by the at least one translation instruction, and wherein the at least one translation instruction has a format in which no bits are defined for designating use of the plurality of translation registers.

38. A computer program product as recited in claim 36, wherein the at least one translation instruction is selected from a group consisting of a first set of instructions that facilitate transfer of data between different address locations in a storage medium, between the storage medium and the plurality of translation registers, and between one of the plurality of translation registers and another one of the plurality of translation registers and a second set of instructions that perform arithmetic operations using the data stored in the plurality of translation registers as operands.

39. A computer program product as recited in claim 36, wherein the second processor is a reduced instruction set computer (RISC) processor and the at least one translation instructions comprises at least one RISC instruction.

40. A computer program product as recited in claim 39, wherein the machine code that is associated with a first processor comprises complex instruction set computer (CISC) instructions.

41. A computer program as recited in claim 36, wherein the second processor is communicatively coupled to a plurality of general purpose registers, and wherein the at least one translation instruction has a format in which at least one bit is defined for designating use of at least one of the plurality of general purpose registers.

* * * * *